(12) United States Patent
Ling et al.

(10) Patent No.: US 12,235,676 B2
(45) Date of Patent: Feb. 25, 2025

(54) SUPPORT DEVICE AND ELECTRONIC SYSTEM

(71) Applicant: Lenovo (Beijing) Limited, Beijing (CN)

(72) Inventors: Riyi Ling, Beijing (CN); Weiqiang Fang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 301 days.

(21) Appl. No.: 17/684,170

(22) Filed: Mar. 1, 2022

(65) Prior Publication Data

US 2023/0097565 A1 Mar. 30, 2023

(30) Foreign Application Priority Data

Sep. 30, 2021 (CN) .......................... 202111165612.2

(51) Int. Cl.
*G06F 1/16* (2006.01)
*F16M 11/22* (2006.01)

(52) U.S. Cl.
CPC ........... *G06F 1/1601* (2013.01); *F16M 11/22* (2013.01)

(58) Field of Classification Search
CPC ..... G06F 1/1601; G06F 1/1632; F16M 11/22; F16M 2200/02; F16M 11/041; F16M 11/04; F16M 7/00; F16M 11/20; F16M 11/02

See application file for complete search history.

(56) References Cited

U.S. PATENT DOCUMENTS

| | | | | |
|---|---|---|---|---|
| 8,797,728 | B2 * | 8/2014 | Han | F16M 11/2021 361/679.21 |
| 10,108,221 | B1 * | 10/2018 | Gu | G06F 1/181 |
| 10,340,673 | B2 * | 7/2019 | Li | H02G 3/0437 |
| 10,452,096 | B1 * | 10/2019 | Keilers | F16M 11/22 |
| 10,860,066 | B1 * | 12/2020 | Barnard | F16M 11/041 |
| 10,955,873 | B1 * | 3/2021 | Godfrey | H05K 5/0234 |
| 11,477,902 | B2 * | 10/2022 | Hobbs | H05K 5/0017 |
| 11,500,426 | B2 * | 11/2022 | Godfrey | G06F 1/203 |
| 11,681,333 | B2 * | 6/2023 | Yao | G06F 1/1647 361/679.01 |
| 11,687,122 | B2 * | 6/2023 | Cho | F16M 11/04 361/679.01 |

(Continued)

FOREIGN PATENT DOCUMENTS

CN 211083438 U 7/2020

*Primary Examiner* — Rockshana D Chowdhury
(74) *Attorney, Agent, or Firm* — ANOVA LAW GROUP, PLLC

(57) ABSTRACT

A support device. The support device includes a seat for contacting a bearing surface when the support device is placed on the bearing surface and a support body having a first end and a second opposite end for supporting an output device, the first end being connected to the seat, the second end being connected to the output device, the connected output device facing a first direction. The support body includes a first receiving space, and the first receiving space is configured to accommodate at least a part of a processing device. The support body includes at least one opening facing a second direction, at least a part of an interaction part of the processing device to be placed in the first receiving space is exposed through the opening, and the second direction is different from an opposite direction of the first direction.

18 Claims, 14 Drawing Sheets

(56) References Cited

U.S. PATENT DOCUMENTS

| | | | | |
|---|---|---|---|---|
| 2010/0188812 A1* | 7/2010 | Morrison | ................ | G06F 1/181 |
| | | | | 248/274.1 |
| 2011/0216493 A1* | 9/2011 | Zheng | ..................... | G06F 1/203 |
| | | | | 361/679.21 |
| 2013/0163170 A1* | 6/2013 | Chen | ..................... | G06F 1/1605 |
| | | | | 361/679.4 |
| 2013/0181903 A1* | 7/2013 | Hsu | ....................... | G06F 1/1662 |
| | | | | 248/122.1 |
| 2017/0329364 A1* | 11/2017 | Kim | ....................... | F16M 11/22 |
| 2019/0261525 A1* | 8/2019 | Chiu | .................... | H05K 5/0234 |
| 2022/0019262 A1* | 1/2022 | Kamata | ................ | G06F 1/1632 |

* cited by examiner

SUPPORT DEVICE AND ELECTRONIC SYSTEM

CROSS-REFERENCES TO RELATED APPLICATION

This application claims priority to Chinese Patent Application No. 202111165612.2 filed on Sep. 30, 2021, the entire content of which is incorporated herein by reference.

FIELD OF TECHNOLOGY

The present disclosure relates to a support device and an electronic system.

BACKGROUND

A support device can be used to support a display device. However, the utility of the support device is generally limited.

BRIEF SUMMARY OF THE DISCLOSURE

One aspect of the present disclosure provides a support device. The support device includes a seat for contacting a bearing surface when the support device is placed on the bearing surface and a support body having a first end and a second opposite end for supporting an output device, the first end being connected to the seat, the second end being connected to the output device, the connected output device facing a first direction. The support body includes a first receiving space, and the first receiving space is configured to accommodate at least a part of a processing device. The support body includes at least one opening facing a second direction, at least a part of an interaction part of the processing device to be placed in the first receiving space is exposed through the opening, and the second direction is different from an opposite direction of the first direction.

Another aspect of the present disclosure provides an electronic system. The electronic system includes an output device and a support device. The support device includes a seat for contacting a bearing surface when the support device is placed on the bearing surface and a support body having a first end and a second opposite end for supporting the output device, the first end being connected to the seat, the second end being connected to the output device, the output device facing a first direction. The support body includes a first receiving space, and the first receiving space is configured to accommodate at least a part of a processing device. The support body includes at least one opening facing a second direction, at least a part of an interaction part of the processing device to be placed in the first receiving space is exposed through the opening, and the second direction is different from an opposite direction of the first direction.

BRIEF DESCRIPTION OF THE DRAWINGS

To illustrate the technical solution more clearly in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

REFERENCE NUMERALS

Figure 1:
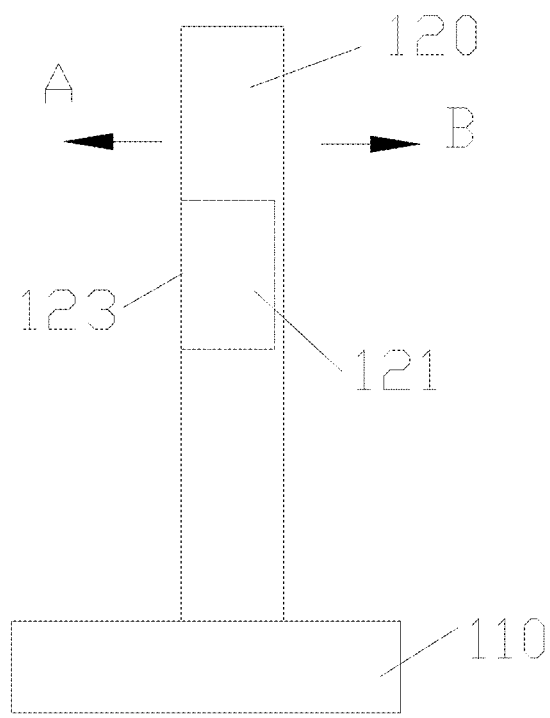
FIG. 1 is a schematic structural diagram of a support device according to an embodiment of the present disclosure.

110 Seat
120 Support body
121 First receiving space
123 First opening
124 Second opening
125 Locking hole
126 Slot
130 Operating part
140 Positioning part
141 Contact part
150 Support accessory
151 Hook
152 Protrusion mechanism
200 Processing device
201 Button
300 Output device

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

In the present disclosure, unless otherwise specified and limited, the term "connected" should be understood in a broad sense. For example, the term may include electrical connection, communication between two inner components, direct connection, connection through a medium therebetween. Those skilled in the art may understand specific meaning of the above-described term according to specific situation.

Terms of "first/second/third" used in the embodiments of the present disclosure only distinguish similar objects, and does not represent a specific order of objects. The specific order or sequence of the "first/second/third" is allowed to be interchangeable. The objects distinguished by "first/second/third" are interchangeable under an appropriate situation. As such, embodiments of the present disclosure described here may describe sequence embodiments in addition to the drawings or described sequences.

The support device described in the embodiments of the present disclosure will be described below with reference to FIGS. 1-26.

The support device includes a seat 110 and a support body 120. The seat 110 may be used for contacting a bearing surface when the support device is placed on the bearing surface. The support body 120 may be used to support an output device 300, and the support body 120 may have opposite first and second ends. The first end may be connected to the seat 110, and the second end may be used to connect the output device 300. In some embodiments, the output device 300 connected to the support body 120 may face a first direction. The support body 120 includes a first receiving space 121, and the first receiving space 121 may be used to receive at least a part of a processing device 200. In some embodiments, the support body 120 may have at least one opening that may face a second direction, and at least the part of the interaction part of the processing device 200 that can be positioned in the first receiving space 121 may be exposed through the opening. In some embodiments, the second direction may be different from the reverse of the first direction. By accommodating at least a part of the processing device 200 in the first receiving space 121 of the support body 120, the processing device 200 can be hidden in the support body 120, and the interactive part of the processing device 200 can be exposed through the opening. Further, the interactive part of the processing device 200 can also be manipulated through the opening, which greatly improves the adaptability of the support device.

In the embodiments of the present disclosure, the structure of the seat 110 is not limited. For example, the 110 may be a block-shaped structure or a plate-shaped structure.

In some embodiments, the bearing surface may be a desktop or a ground.

In the embodiments of the present disclosure, the support body 120 may be used to support the output device 300, such that the output device 300 and the bearing surface can have a set height through the support body 120 and the seat 110. In some embodiments, the support body 120 may be a strip-shaped structure or a plate-shaped structure.

The structure of the output device 300 is not limited in the present disclosure, as long as the output device 300 can output toward the first direction. For example, the output device 300 may be a display screen that outputs the display content toward the first direction.

In the embodiments of the present disclosure, the first receiving space 121 may communicate with at least one opening, and the number of openings is not limited in the present disclosure. For example, the support body 120 may include at least a first opening 123. The first opening 123 may face the second direction, and at least the part of the interaction part of the processing device 200 that can be located in the first receiving space 121 can be exposed through the first opening 123.

Figure 8:
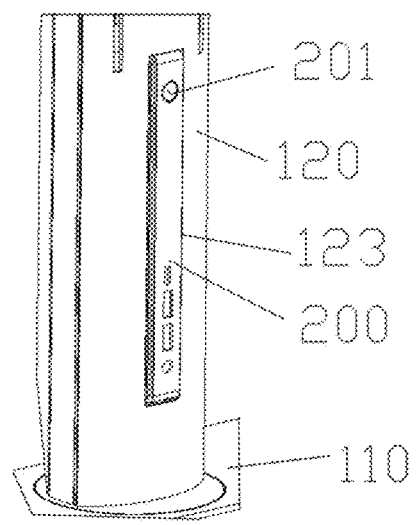
FIG. 8 is a partial schematic structural diagram of the support device according to an embodiment of the present disclosure.

The interactive part of the processing device 200 may be the part with interactive components. The interactive components may be input components, output components, or input components and output components. For example, as shown in FIG. 8, the interactive components may include a button 201. In another example, the interactive components may include a lighting piece. In another example, the interactive components may include an audio interface and/ or a data interface.

In some embodiments, the second direction may be different from the reverse of the first direction, and the second direction may be the same as the first direction or different from the first direction. For example, the first direction may be the front of the support device, and the output device 300 may be configured to output the output toward the front of the support device. Correspondingly, the reverse of the first direction may be the back of the support device, and the opening may not face the back of the support device to facilitate the operation of the interactive part.

In some embodiments, the first receiving space 121 may accommodate part of the processing device 200, or the first receiving space 121 accommodate receive the entire processing device 200.

Figure 2:
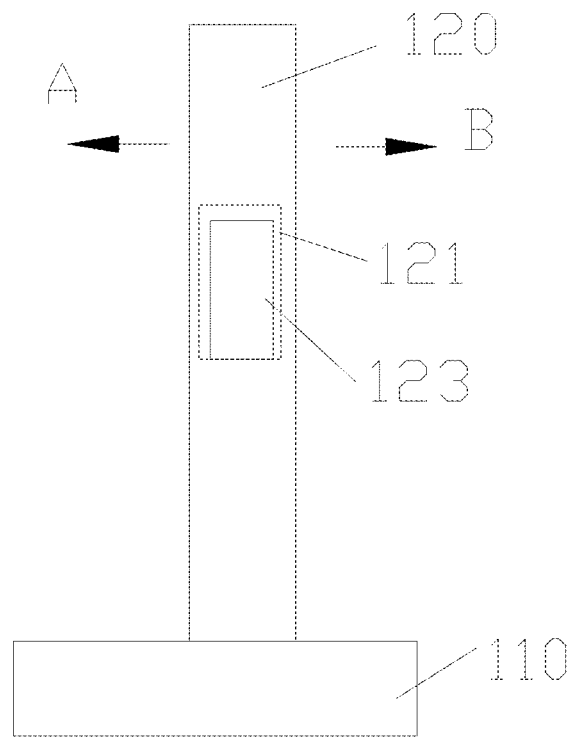
FIG. 2 is a schematic structural diagram of the support device according to an embodiment of the present disclosure.

For example, the first receiving space 121 may be located inside the support body 120, and the support body 120 may have a first opening 123. An shown in FIG. 1, the first opening 123 faces the first direction A, as shown in FIG. 2, the first opening 123 is also located on the side of the support body 120. At this time, the first opening 123 does not face the reverse direction B of the first direction A. In this case, the first receiving space 121 may accommodate the entire processing device 200, and the processing device 200 can be put into the first receiving space 121 through the first opening 123.

In some embodiments, the support body 120 may include a first opening 123 and a second opening 124 that can communicate with each other. The processing device 200 may enter the first receiving space 121 from the second opening 124, the interactive part may be exposed through the 123, and the first opening 123 may face the second direction.

Figure 7:
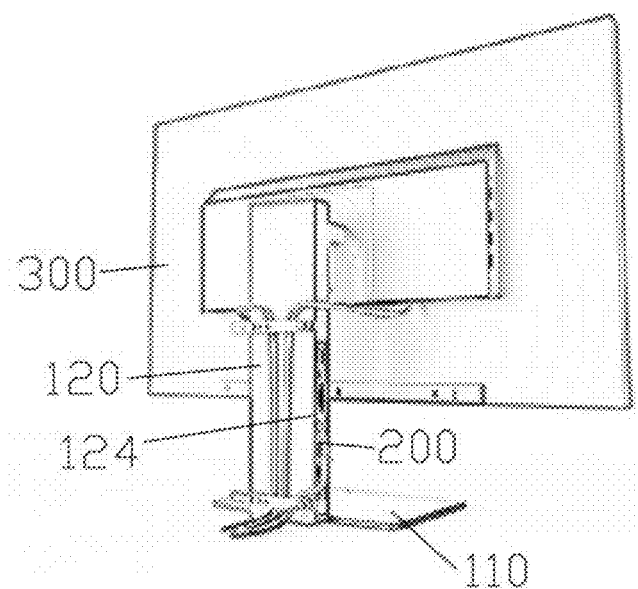
FIG. 7 is a schematic structural diagram of the support device according to an embodiment of the present disclosure.

In some embodiments, as shown in FIG. 7, an external interface of the processing device 200 is exposed through the second opening 124, such that the external interface of the processing device 200 can be connected with other interfaces.

In some embodiments, the first opening 123 and the second opening 124 may communicate with the first receiving space 121 respectively, and the areas of the first opening 123 and the second opening 124 are not limited in the present disclosure. For example, the cross-sectional area of the second opening 124 may be larger than the cross-sectional area of the first opening 123.

In some embodiments, the first opening 123 may be positioned on a phase plate side of the support body 120, or the first opening 123 may be positioned on the adjacent side of the support body 120.

Figure 3:
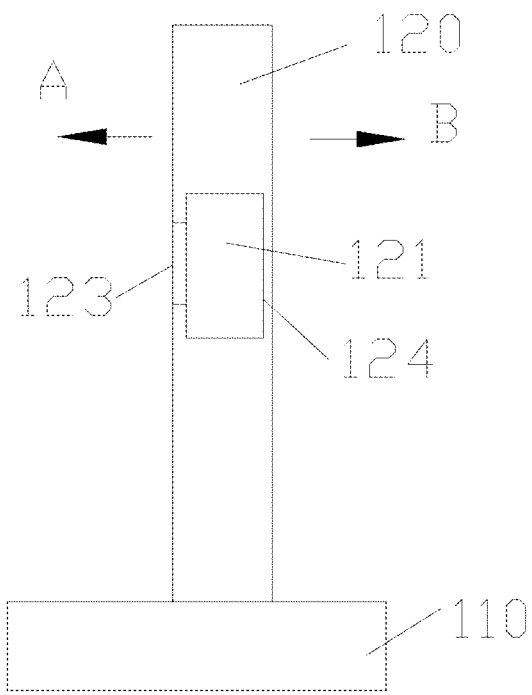
FIG. 3 is a schematic structural diagram of the support device according to an embodiment of the present disclosure.

For example, as shown in FIG. 3, the first opening 123 is facing the first direction and the second opening 124 is positioned on the side of the support body 120. In this case, the first receiving space 121 may accommodate the entire processing device 200. Of course, the first receiving space 121 may accommodate part of the processing device 200. In this case, other parts of the processing device 200 may be positioned outside the support body 120 through the second opening 124.

In another example, the second opening 124 may be positioned on a first side of the support body 120, and the first opening 123 may be positioned on a second side of the support body 120, where the first side of the support body 120 may be opposite to the second side of the support body 120.

Figure 4:
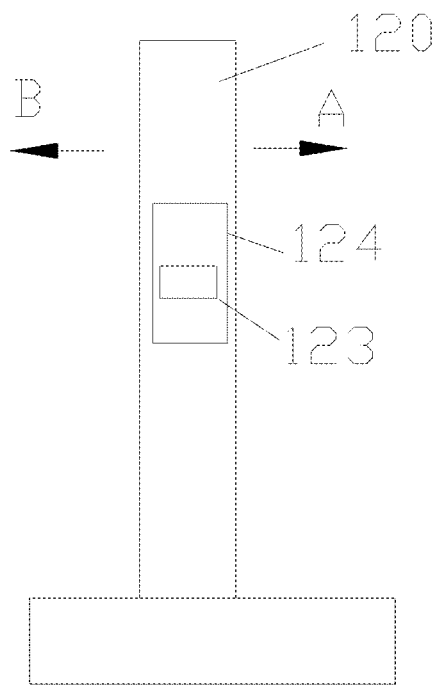
FIG. 4 is a schematic structural diagram of the support device according to an embodiment of the present disclosure.
Figure 5:
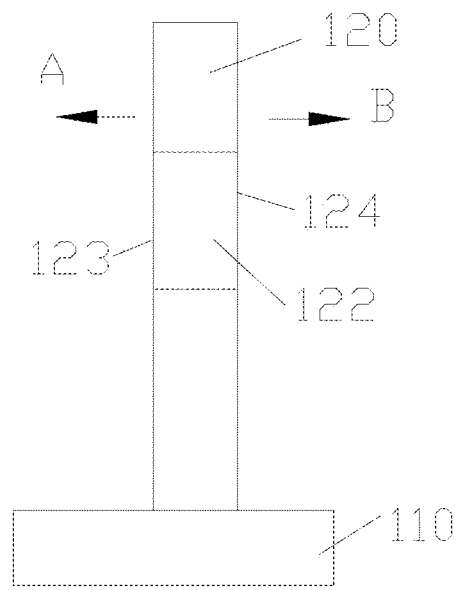
FIG. 5 is a schematic structural diagram of the support device according to an embodiment of the present disclosure.
Figure 6:
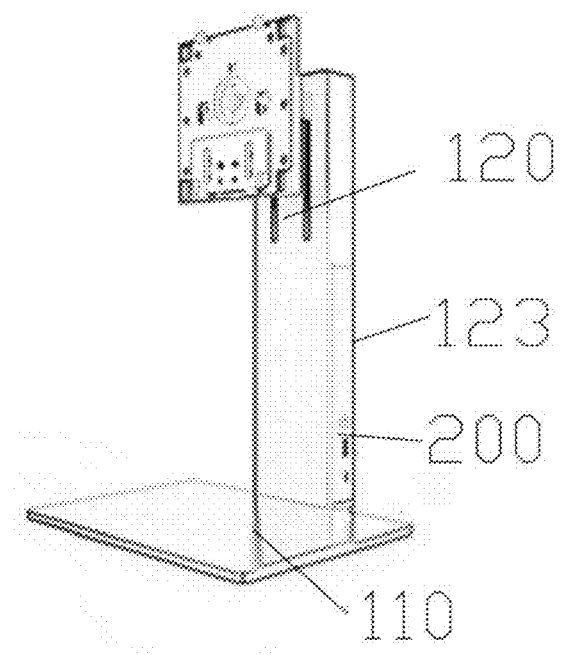
FIG. 6 is a schematic structural diagram of the support device according to an embodiment of the present disclosure.

In some embodiments, as shown in FIG. 5, the first opening 123 is facing the first direction A, and the second opening 124 is facing the opposite direction B of the first direction. Of course, as shown in FIGS. 4, 7 and 7, the first opening 123 can also not face the first direction A, and the first opening 123 can be disposed on one side of the support body 120.

In some embodiments, the first receiving space 121 may accommodate at least a part of the processing device 200, and the processing device 200 may be kept in the first receiving space 121 when an external force is applied to the interactive part. In some embodiments, the direction of the external force may be from the first opening 123 to the second opening 124 in order to prevent at least the part of the processing device 200 from being detached from the first receiving space 121 when the interactive part is operated. It should be noted that the implementation method in which the processing device 200 is kept in the first receiving space 121 is not limited in the present disclosure.

Figure 9:
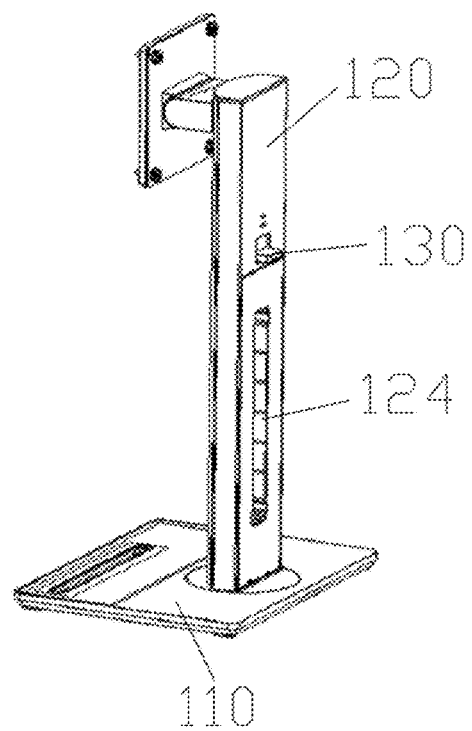
FIG. 9 is a schematic structural diagram of the support device according to an embodiment of the present disclosure.
Figure 10:
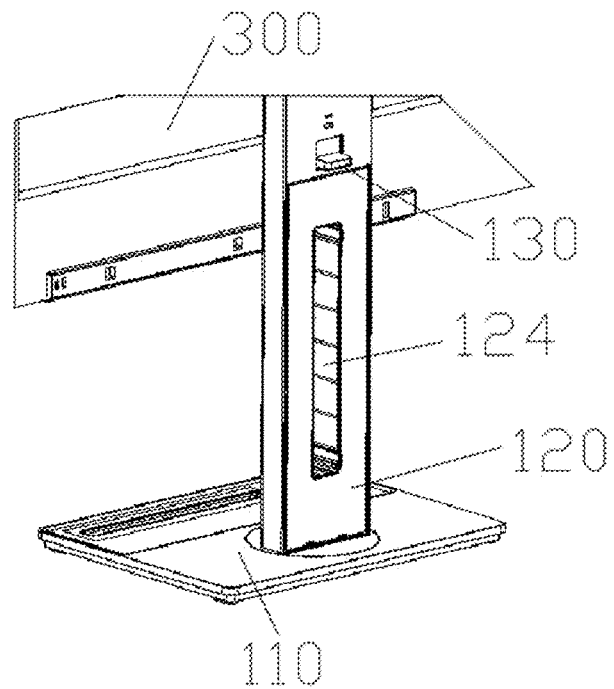
FIG. 10 is a partial schematic structural diagram of the support device according to an embodiment of the present disclosure.
Figure 11:
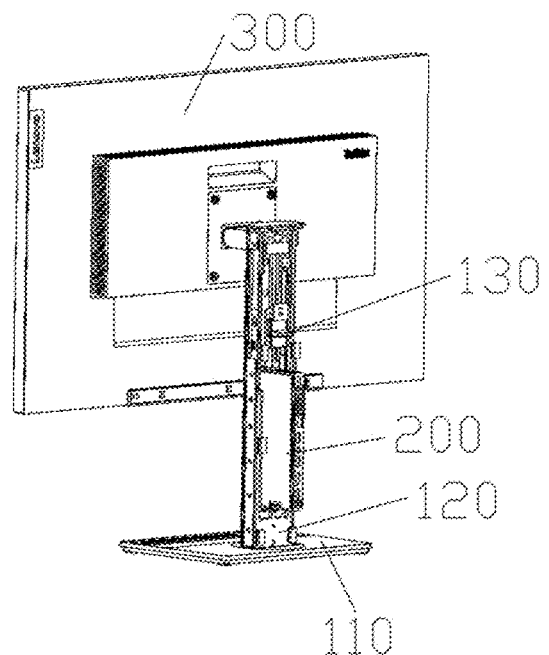
FIG. 11 is a schematic structural diagram of the support device according to an embodiment of the present disclosure.

In some embodiments, as shown in FIGS. 9, 10 and 11, the support device includes an operating part 130. The operating part 130 may be disposed on the support body 120, and the operating part 130 may be configured to move to a first position and a second position. When the operating part 130 is in the first position, the operating part 130 may be used to keep the processing device 200 in the first receiving space 121. When the operating part 130 is in the second position, the processing device 200 may be pulled out from the first receiving space 121.

In some embodiments, the operating part 130 may be movably disposed on the support body 120, and the operating part 130 may also be rotatably disposed on the support body 120.

The operating part 130 may be directly connected to or disconnected from the processing device 200 located in the first receiving space 121, or the operating part 130 may be connected to or disconnected from the processing device 200 located in the first receiving space 121 through other structural parts. For example, a connection may refer to an abutment of the surface of the operating part 130 or other structural parts with the surface of the processing device 200. In another example, a connection may refer to the operating part 130 or other structural parts being inserted in a slot of the processing device 200. When the operating part 130 is in the first position, the operating part 130 or other structural parts may be connected to the processing device 200. When the operating part 130 is in the second position, the operating part 130 or other structural parts may be disconnected from the processing device 200

Figure 12:
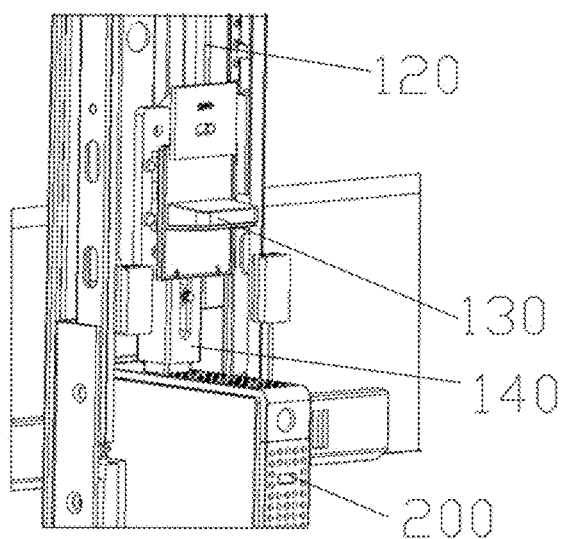
FIG. 12 is a partial schematic structural diagram of the support device according to an embodiment of the present disclosure.
Figure 14:
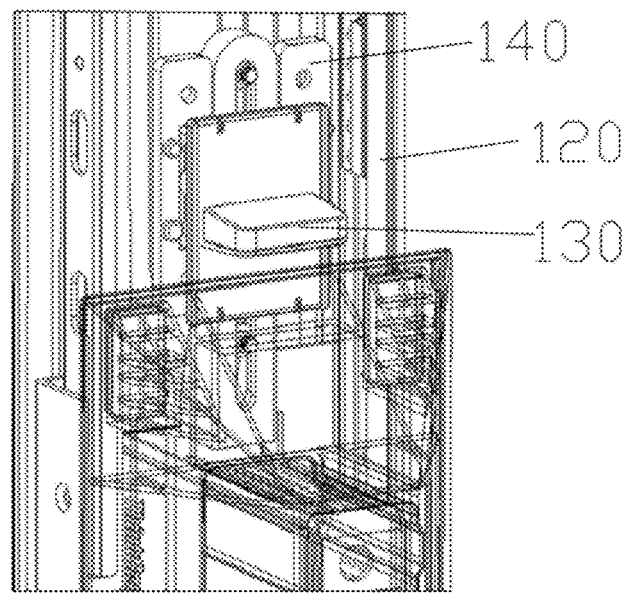
FIG. 14 is a partial schematic structural diagram of the support device according to an embodiment of the present disclosure.

In some embodiments, as shown in FIG. 12 and FIG. 14, the support device further includes a positioning part 140. The positioning part 140 may slide in a slideway, and the positioning part 140 may be used for connecting or disconnecting with the processing device 200. The operating part 130 may be connected to the positioning part 140, at least a part of the operating part 130 may be disposed outside the support body 120, and at least the part of the operating part 130 may drive the positioning part 140 to move to or from the processing device 200 under the action of an external force.

In some embodiments, the operating part 130 and the positioning part 140 may be connected by screws, or the operating part 130 and the positioning part 140 may be connected by a snap structure.

Figure 13:
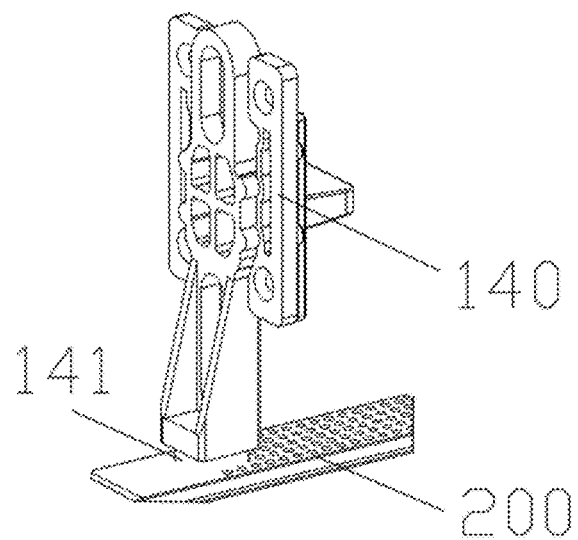
FIG. 13 is a partial schematic structural diagram of the support device according to an embodiment of the present disclosure.

In some embodiments, as shown in FIG. 13, the positioning part 140 includes a contact part 141. The contact part 141 is positioned on the side of the positioning part 140 facing the first receiving space 121, and the contact part 141 may be used to contact the processing device 200. The hardness of the contact part 141 may be lower than the hardness of the processing device 200 to prevent the contact part 141 from damaging the processing device 200. For example, the contact part 141 may be a rubber structure.

In some embodiments, the support device may further include a limiting component. At least a part of the limiting component may be disposed on the support body 120, and at least the part of the limiting component may move to a third position and a fourth position. When at least the part of the limiting component is in the third position, the limiting component may keep the operating part 130 in the first position. When at least the part of the limiting component is in the fourth position, the operating part 130 may move from the first position to the second position. The limiting component can prevent the processing device 200 from being pulled out of the first receiving space 121 by an external force accidentally applied on the operating part 130.

Figure 15:
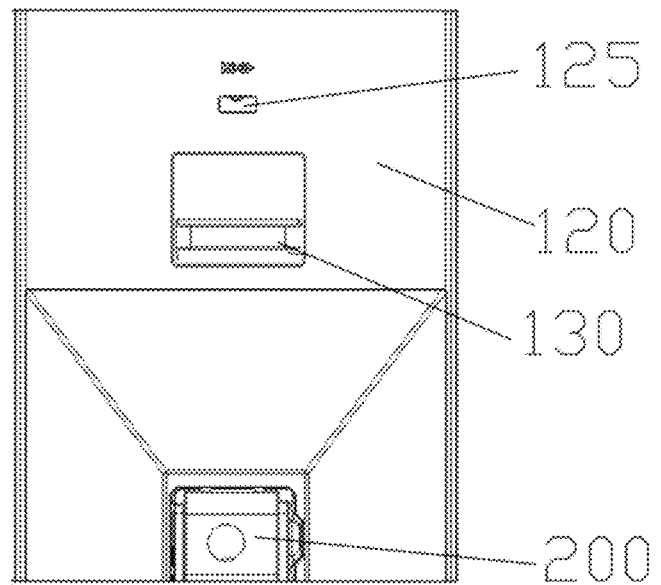
FIG. 15 is a partial schematic structural diagram of the support device according to an embodiment of the present disclosure.
Figure 16:
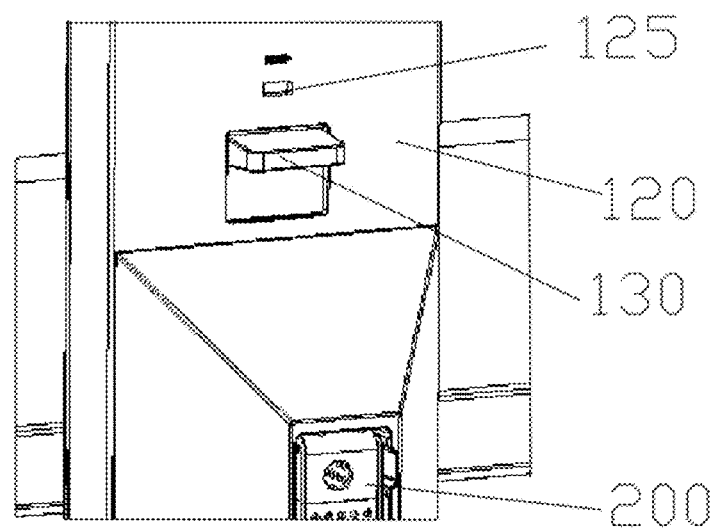
FIG. 16 is a partial schematic structural diagram of the support device according to an embodiment of the present disclosure.
Figure 17:
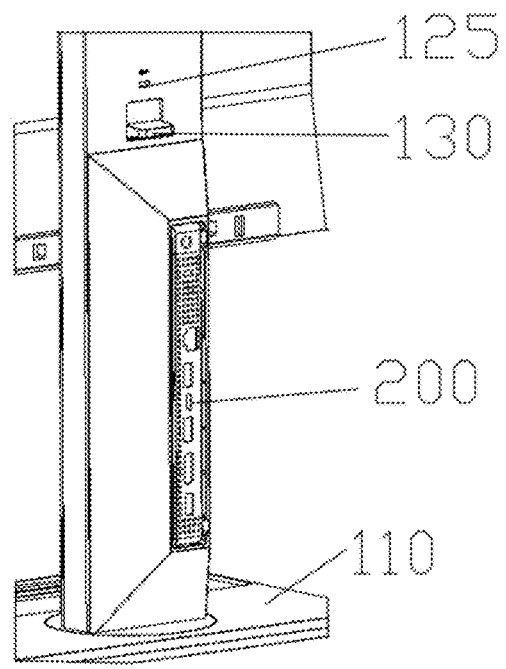
FIG. 17 is a partial schematic structural diagram of the support device according to an embodiment of the present disclosure.
Figure 18:
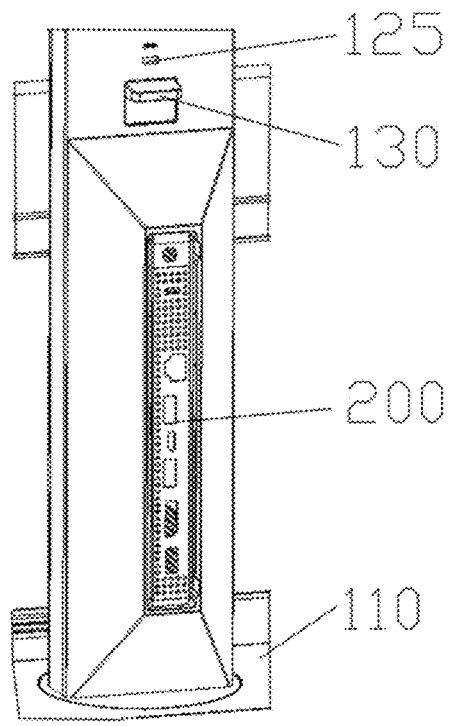
FIG. 18 is a partial schematic structural diagram of the support device according to an embodiment of the present disclosure.

The structure of the limiting component is not limited in the present disclosure. For example, the support body 120 may include a slideway and a locking hole 125. The slideway may be located in the support body 120, and the slideway may be connected to the first receiving space 121. The locking hole 125 may be located on the surface of the support body 120, and the locking hole 125 may be connected to the slideway. The limiting component may include a first locking piece and a second locking piece. The first locking piece may be movably disposed in the support body 120, and the first locking piece may correspond to the position of the positioning part 140. The second locking piece may be inserted into the locking hole 125 to cooperate with the first locking piece. As shown in FIG. 15 and FIG. 17, when the operating part 130 drives the positioning part 140 to slide to the first position in the slideway, the second locking piece may drive the first locking piece to move to the third position or the fourth position through the locking hole 125. In the third position, the first locking piece ma fix the positioning part 140 relative to the slideway, and in the fourth position, the positioning part 140 may slide relative to the slideway. When the operating part 130 drives the positioning part 140 to slide to the first position in the slideway, the operating part 130 may keep in the processing device 200 in the first receiving space 121 through the positioning part 140. The position of the positioning part 140 may be kept unchanged by moving the first locking piece to the third position through the second locking piece, such that the processing device 200 can be stably kept in the first receiving space 121. As shown in FIG. 16 and FIG. 18, when the processing device 200 needs to be taken out from the first receiving space 121, the first locking piece may be moved to the fourth position through the second locking piece. At this time, the operating part 130 may drive the positioning part 140 to slide to the second position in the slideway. When the operating part 130 keeps the processing device 200 in the first receiving space 121 through the positioning part 140, the processing device 200 may be taken out only by holding the second locking piece, thereby preventing the processing device 200 from being lost.

In some embodiments, the first locking piece is similar to a lock cylinder, and the second locking piece is similar to a key.

In some embodiments, the positioning part 140 or the operating part 130 may further include a shielding part. The shielding part may correspond to the position of the locking hole 125. When the operating part 130 drives the positioning part 140 to slide to the first position in the slideway, a part of the positioning part 140 may protrude from the surface of the first receiving space 121, the shielding part may be staggered from the locking hole 125, and the locking hole 125 may be exposed. The second locking piece may drive the first locking piece to move to the third position or the fourth position through the locking hole 125. In the third position, the first locking piece may fix the positioning part 140 relative to the slideway, and in the fourth position, the positioning part 140 may slide relative to the slideway. When the operating part 130 drives the positioning part 140 to slide to the second position in the slideway, a part of the positioning part 140 may be recessed in the surface of the first receiving space 121, and the shielding part may block the locking hole 125. In this way, the shielding part can be used to block the locking hole 125 to prevent the second locking piece from being mistakenly inserted into the locking hole 125 when the operating part 130 drives the positioning part 140 to slide to the second position in the slideway.

Figure 19:
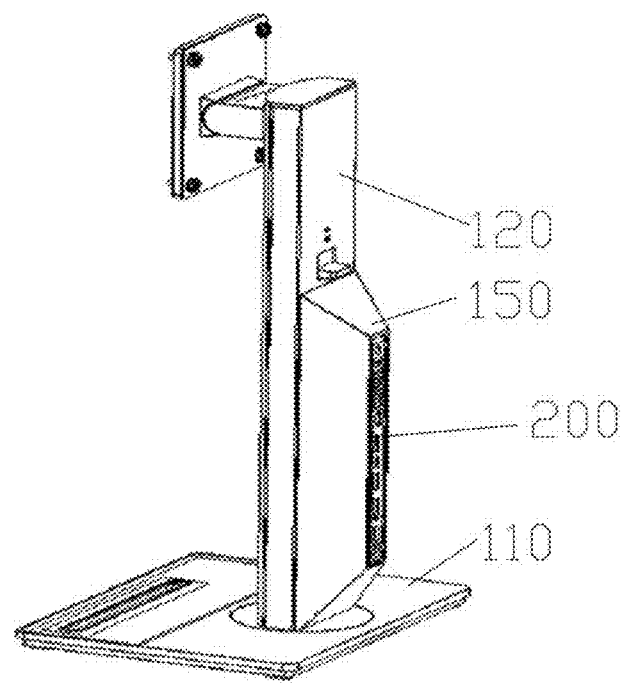
FIG. 19 is a schematic structural diagram of the support device according to an embodiment of the present disclosure.
Figure 20:
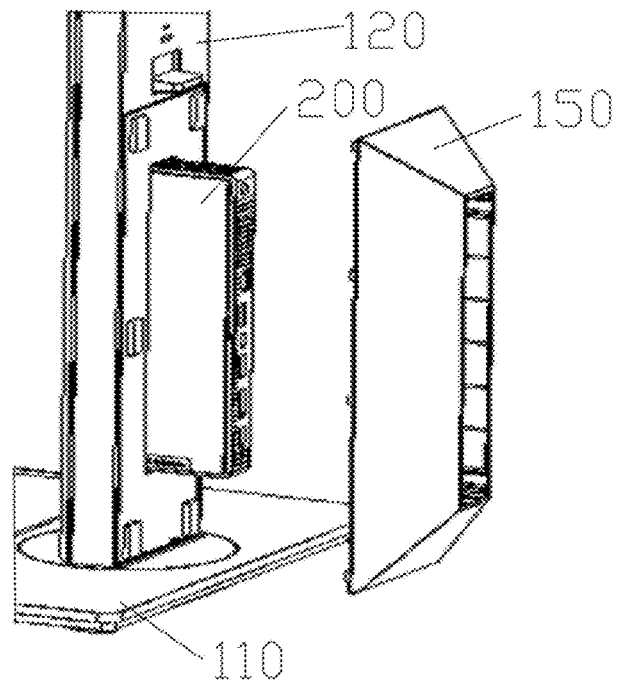
FIG. 20 is a partial schematic structural diagram of the support device according to an embodiment of the present disclosure.

In some embodiments, as shown in FIG. 19 and FIG. 20, the support device includes a support accessory 150. The support accessory 150 may be detachably connected to the support body 120, and the support accessory 150 may have a second receiving space. When the support accessory 150 is connected to the support body 120, the second receiving space may communicate with the first receiving space 121, and the first receiving space 121 and the second receiving space may collectively accommodate the entire processing device 200, thereby keeping the support device clean.

In some embodiments, the support accessory 150 may also be used to keep the processing device 200 in the first receiving space 121.

The method in which the support accessory 150 is used to keep the processing device 200 in the first receiving space 121 is not limited in the present disclosure.

For example, the support accessory 150 may only include one opening communicating with the second receiving space. At this time, the processing device 200 may be accommodated in the second receiving space of the support accessory 150 through the opening. The support accessory 150 can not only accommodate the processing device 200, but can also block the second opening 124, such that the processing device 200 can be kept in the first receiving space 121.

Figure 24:
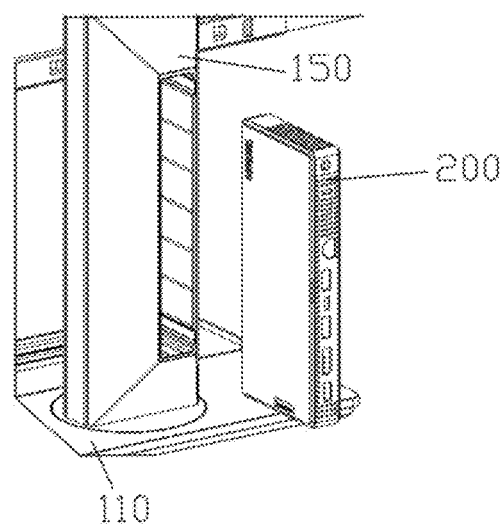
FIG. 24 is a partial schematic structural diagram of the support device according to an embodiment of the present disclosure.

In another example, as shown in FIG. 24, the second receiving space can be a through-slot structure. The second receiving space includes two openings. The inner wall forming the second receiving space may also include a clamping mechanism for clamping the processing device 200, and the processing device 200 may be kept in the first receiving space 121 through the clamping mechanism.

Figure 21:
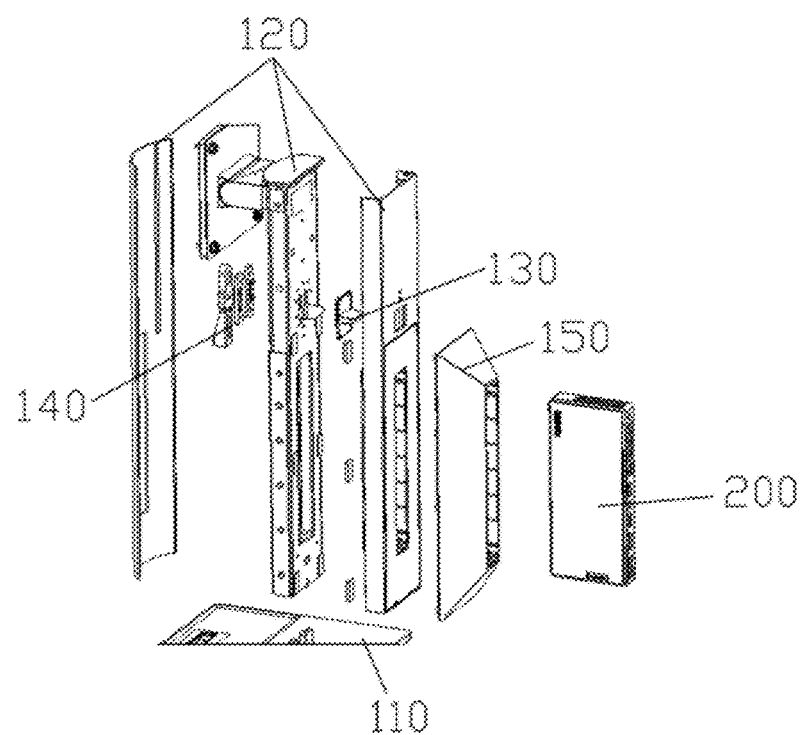
FIG. 21 is a partial structural exploded view of the support device according to an embodiment of the present disclosure.

Of course, the support accessory 150 may also only be used for accommodating the processing device 200 through the second receiving space. The second receiving space may be a through-slot structure. At this time, the processing device 200 may be kept in the first receiving space 121 through the operating part 130, and the processing device 200 may be inserted into the first receiving space 121 through the second receiving space of the through-slot structure, as shown in FIG. 21.

Figure 22:
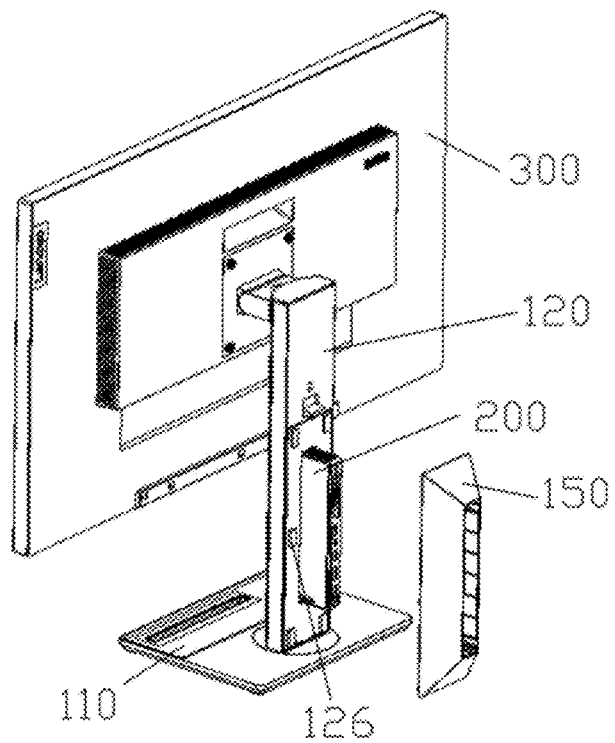
FIG. 22 is a schematic structural diagram of the support device according to an embodiment of the present disclosure.
Figure 23:
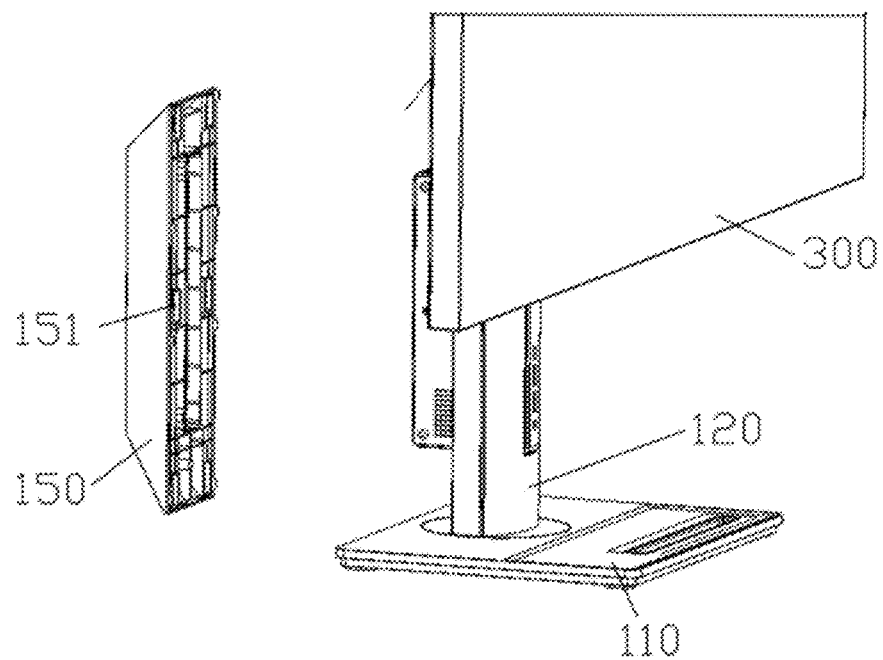
FIG. 23 is a schematic structural diagram of the support device according to an embodiment of the present disclosure.

The method in which the support accessory 150 is detachably connected to the support body 120 is not limited in the present disclosure. For example, as shown in FIG. 22 and FIG. 23, the support body 120 includes a slot 126, the support accessory 150 includes a hook 151, and the support accessory 150 is detachably connected to the support body 120 by being clamped in the slot 126 through the hook 151. In another example, the support body 120 may include a first absorption piece, the hook 151 may include a second absorption piece, and the support accessory 150 may be detachably connected to the support body 120 through the absorption connection of the first absorption piece and the second absorption piece. In some embodiments, the first absorption piece may be a piece of iron, and the second absorption piece may be a magnetic piece.

Figure 25:
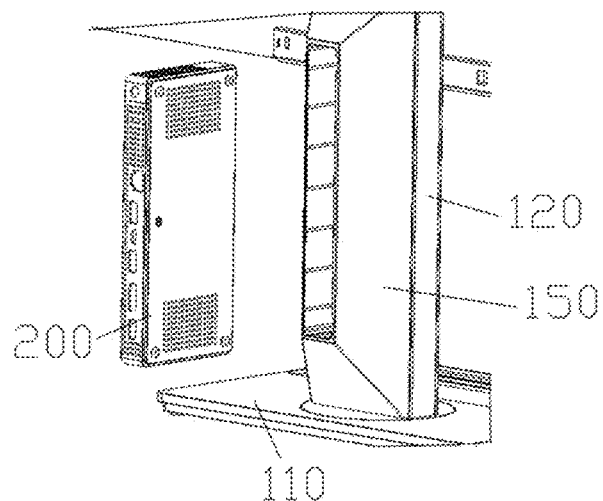
FIG. 25 is a partial schematic structural diagram of the support device according to an embodiment of the present disclosure.
Figure 26:
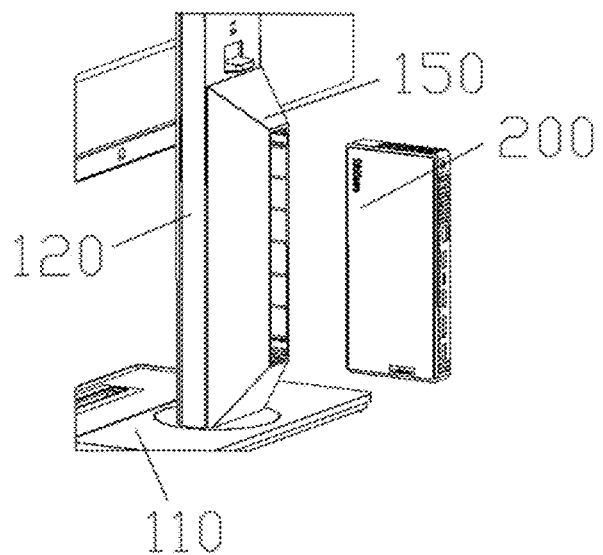
FIG. 26 is a partial schematic structural diagram of the support device according to an embodiment of the present disclosure.

In some embodiments, as shown in FIG. 25 and FIG. 26, a strip-shaped protrusion mechanism 152 may be arrange on the inner wall forming the second receiving space. In this way, when the processing device 200 is inserted from the second receiving space of the through-slot structure, friction can be reduced. Further, the protrusion mechanism 152 may be in contact with the processing device 200 located in the second receiving space, and the strip-shaped protrusion mechanism 152 may also prevent the processing device 200 from shaking.

Consistent with the present disclosure, the support device includes a seat 110 that can be used for contacting the bearing surface when the support device is placed on the bearing surface; and a support body 120 that can be used for supporting the output device 300. The support body 120 may have a first end and a second end. The first end may be connected to the seat 110, and the second end may be connected to the output device 300. In some embodiments, the connected output device 300 may face the first direction. In some embodiments, the support body 120 may include a first receiving space 121, and the first receiving space 121 may be used to receive at least a part of a processing device 200. In some embodiments, the support body 120 may have at least one opening that may face a second direction, and at least the part of the interaction part of the processing device 200 that can be positioned in the first receiving space 121 may be exposed through the opening. In some embodiments, the second direction may be different from the reverse of the first direction. By accommodating at least the part of the processing device 200 in the first receiving space 121 of the support body 120, the processing device 200 can be hidden in the support body 120, and the interactive part of the processing device 200 can be exposed through the opening. Further, the interactive part of the processing device 200 can also be manipulated through the opening, which greatly improves the adaptability of the support device.

An embodiment of the present disclosure further provides an electronic system. The electronic system may include a support device and an output device 300. The support device may include a seat 110 and a support body 120. The seat 110 may be used for contacting the bearing surface when the support device is placed on the bearing surface. The support body 120 may be used to support an output device 300. The support body 120 may have a first end opposite to a second end. The first end may be connected to the seat 110, and the second may be connected to the output device 300. In some embodiments, the output device 300 may face a first direction. In some embodiments, the support body 120 may include a first receiving space 121, and the first receiving space 121 may be used to receive at least a part of a processing device 200. In some embodiments, the support body 120 may have at least one opening that may face a second direction, and at least the part of the interaction part of the processing device 200 that can be positioned in the first receiving space 121 may be exposed through the opening. In some embodiments, the second direction may be different from the reverse of the first direction.

The structure of the electronic system is not limited in the present disclosure. For example, the electronic system may be a display device with a support device.

The support device has been described in the foregoing embodiments, and will not be repeated here.

In some embodiments, the output device 300 may be a computer monitor or a flat-screen TV.

Figure 27:
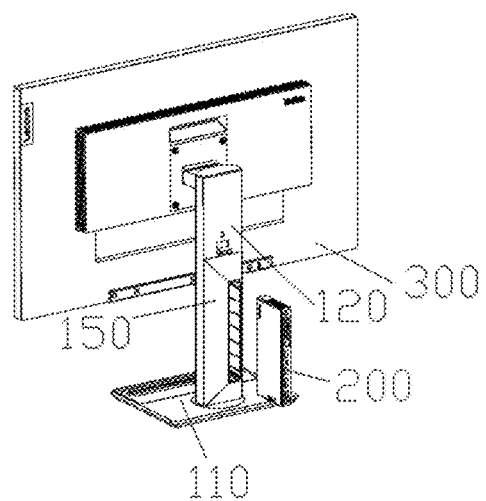
FIG. 27 is a schematic structural diagram of an electronic system according to an embodiment of the present disclosure.
Figure 28:
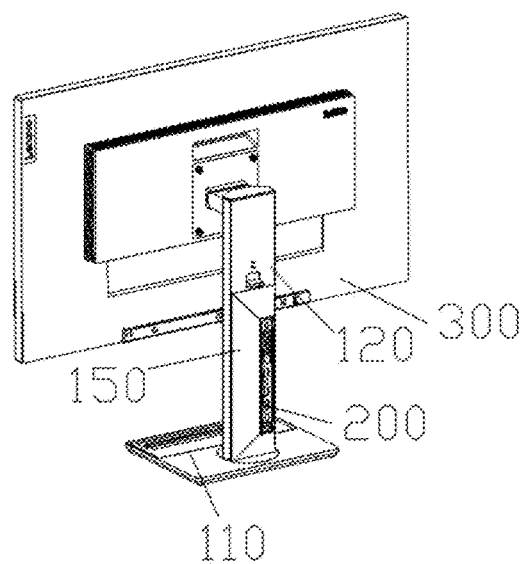
FIG. 28 is a schematic structural diagram of the electronic system according to an embodiment of the present disclosure.

In some embodiments, the electronic system may further include a processing device 200. As shown in FIG. 28, when at least a part of the processing device 200 is located in the first receiving space 121, at least the part of the processing device 200 can be connected to the output device 300. As shown in FIG. 27, when at least the part of the processing device 200 is detached from the first receiving space 121, the processing device 200 can be connected to the output device 300. By disposing the processing device 200 in the first receiving space 121, the electronic system can be made tidier, and the processing device 200 can be easily operated through the first opening 123. At the same time, since the processing device 200 and the output device 300 are two non-integrated structural components of the electronic system, the processing device 200 can also be arranged outside the first receiving space 121. For example, as shown in FIG. 27, the processing device 200 is placed on the surface of a base. In another example, as shown in FIG. 26, the processing device 200 is placed on the bearing surface.

Specific embodiments of the present disclosure are described above. However, the scope of the present disclosure is not limited to these specific embodiments. Any person skilled in the art can easily think of changes or replacements within the technical scope disclosed in the present disclosure. These changes or replacements should be within the scope of the present disclosure. Therefore, the scope of the present invention shall be subject to the scope of the claims.

What is claimed is:

1. A support device comprising:
a seat for contacting a bearing surface when the support device is placed on the bearing surface;
a support body having a first end and a second opposite end for supporting an output device, the first end being connected to the seat, the second end being connected to the output device, the connected output device facing a first direction, wherein:
the support body includes a first receiving space, the first receiving space being configured to accommodate at least a part of a processing device;
the support body includes at least one opening facing a second direction, at least a part of an interaction part of the processing device placed in the first receiving space being exposed through the at least one opening;
the second direction faces to a side of the support body and is about 90° away from the first direction; and
the at least one opening includes a first opening and a second opening communicating with each other, the first opening is arranged on a first surface, the second opening is arranged on a second surface, and the first surface is parallel to the second surface.

2. The support device of claim 1, wherein:
the processing device is configured to enter the first receiving space from the second opening, the interactive part is exposed through the first opening, and the first opening faces the second direction.

3. The support device of claim 2, wherein:
the second opening is located on a first side of the support body, and the first opening is located on a second side of the support body, the first side of the support body being opposite to the second side of the support body.

4. The support device of claim 3, wherein:
the first receiving space is configured to receive at least the part of the processing device; and when an external force is applied to the interactive part of the processing device, the processing device is kept in the first receiving space, the external force being in a direction from the first opening to the second opening.

5. The support device of claim 4 further comprising:
an operating part disposed on the support body and configured to move to a first position and a second position, wherein:
when the operating part is in the first position, the operating part is configured to keep the processing device in the first receiving space; and
when the operating part is in the second position, the processing device is removable from the first receiving space.

6. The support device of claim 5 further comprising:
a limiting component at least partially disposed on the support body and configured to be at least partially movable to a third position and a fourth position, wherein:
when the operating part is in the third position, the limiting component is configured to keep the operating part in the first position; and
when the operating part is in the fourth position, the operating part is movable from the first position to the second position.

7. The support device of claim 6 further comprising:
a positioning part configured to slide within a slideway, the operating part being connected to the positioning part and at least partially disposed outside the support body, the operating part being configured to at least partially drive the positioning part to move to or from the processing device under the external force.

8. The support device of claim 7, wherein the support body includes:
a slideway located in the support body to communicate with the first receiving space; and
a locking hole located on a surface of the support body to communicate with the slideway;
the limiting component includes:
a first locking piece corresponding to a position of the positioning part and movably arranged in the support body; and
a second locking piece insertable into the locking hole to cooperate with the first locking piece, wherein:
when the operating part drives the positioning part to slide to the first position in the slideway, a part of the positioning part protrudes from a surface of the first receiving space, and the second locking piece drives the first locking piece to move to the third position or the fourth position through the locking hole;
when in the third position, the first locking piece is configured to fix the positioning part relative to the slideway, and
when in the fourth position, the first locking piece is configured to allow the positioning part to slide relative to the slideway.

9. The support device of claim 4 further comprising:
a support accessory having a second receiving space for keeping the processing device in the first receiving space, the support accessory being configured to be detachably connected to the support body, wherein:
when the support accessory is connected to the support body, the second receiving space is configured to communicate with the first receiving space to collectively accommodate the processing device.

10. An electronic system comprising:
an output device; and
a support device, the support device including:
a seat for contacting a bearing surface when the support device is placed on the bearing surface;
a support body having a first end and a second opposite end for supporting the output device, the first end being connected to the seat, the second end being connected to the output device, the output device facing a first direction, wherein:
the support body includes a first receiving space, the first receiving space being configured to accommodate at least a part of a processing device;
the support body includes at least one opening facing a second direction, at least a part of an interaction part of the processing device to be placed in the first receiving space being exposed through the at least one opening; and
the second direction is not opposite to the first direction; and
an operating part disposed on the support body and configured to move to a first position and a second position, wherein:
when the operating part is in the first position, the operating part is configured to keep the processing device in the first receiving space; and
when the operating part is in the second position, the processing device is removable from the first receiving space.

11. The electronic system of claim 10, wherein:
when at least the part of the processing device is located in the first receiving space, at least the part of the processing device is configured to be connected to the output device; and
when at least the part of the processing device is detached from the first receiving space, the processing device is configured to be connected to the output device.

12. The electronic system of claim 11, wherein:
at least one opening includes a first opening and a second opening communicating with each other, the processing device is configured to enter the first receiving space from the second opening, the interactive part is exposed through the first opening, and the first opening faces the second direction.

13. The electronic system of claim 12, wherein:
the second opening is located on a first side of the support body, and the first opening is located on a second side of the support body, the first side of the support body being opposite to the second side of the support body.

14. The electronic system of claim 13, wherein:
the first receiving space is configured to receive at least the part of the processing device; and
when an external force is applied to the interactive part of the processing device, the processing device is kept in the first receiving space, the external force being in a direction from the first opening to the second opening.

15. The electronic system of claim 14, wherein:
the support device further includes a limiting component at least partially disposed on the support body and configured to be at least partially movable to a third position and a fourth position, wherein:
when the operating part is in the third position, the limiting component is configured to keep the operating part in the first position; and
when the operating part is in the fourth position, the operating part is movable from the first position to the second position.

16. The electronic system of claim 15, wherein:
the support device further includes a positioning part configured to slide within a slideway, the operating part being connected to the positioning part and at least partially disposed outside the support body, the operating part being configured to at least partially drive the positioning part to move to or from the processing device under the external force.

17. The electronic system of claim 16, wherein the support body includes:
the slideway located in the support body to communicate with the first receiving space; and
a locking hole located on a surface of the support body to communicate with the slideway; and
the limiting component includes:
a first locking piece corresponding to a position of the positioning part and movably arranged in the support body; and
a second locking piece insertable into the locking hole to cooperate with the first locking piece, wherein:
when the operating part drives the positioning part to slide to the first position in the slideway, a part of the positioning part protrudes from a surface of the first receiving space, and the second locking piece drives the first locking piece to move to the third position or the fourth position through the locking hole;
when in the third position, the first locking piece is configured to fix the positioning part relative to the slideway, and
when in the fourth position, the first locking piece is configured to allow the positioning part to slide relative to the slideway.

18. The electronic system of claim 13, wherein the support device further includes a support accessory having a second receiving space for keeping the processing device in the first receiving space, the support accessory being configured to be detachably connected to the support body, when the support accessory is connected to the support body, the second receiving space is configured to communicate with the first receiving space to collectively accommodate the processing device.

* * * * *